United States Patent [19]

Moronaga et al.

[11] Patent Number: 5,101,280
[45] Date of Patent: Mar. 31, 1992

[54] DEVICE FOR CODING A PICTURE SIGNAL BY COMPRESSION

[75] Inventors: Kenji Moronaga; Kenji Ito; Mikio Watanabe, all of Tokyo, Japan

[73] Assignee: Fuji Photo Film Co. Ltd., Japan

[21] Appl. No.: 524,389

[22] Filed: May 17, 1990

[30] Foreign Application Priority Data

May 19, 1989 [JP] Japan .................. 1-124262

[51] Int. Cl.⁵ .............. H04N 1/41; H04N 1/415
[52] U.S. Cl. ................... 358/426; 358/432; 358/433
[58] Field of Search ........... 358/426, 432, 433, 133, 358/138; 382/50, 54

[56] References Cited

U.S. PATENT DOCUMENTS

| | | |
|---|---|---|
| 4,677,479 | 6/1987 | Hatori et al. ............. 358/426 |
| 4,774,574 | 9/1988 | Daly et al. ............... 358/138 |
| 4,982,282 | 1/1991 | Saito et al. .............. 358/427 |

Primary Examiner—Edward L. Coles, Sr.
Assistant Examiner—Thomas D. Lee

[57] ABSTRACT

A picture signal compression coding device is disclosed which divides digital picture data constituting a single picture into a plurality of blocks and codes the picture data block by block by two-dimensional orthogonal transformation. An orthogonal transforming section transforms the digital picture data divided into the plurality of blocks by two-dimensional orthogonal transformation. A normalizing section normalizes the transformed data, while a coding section codes the normalized data. A block activity calculating section calculates an activity of the picture data block by block. An activity summing section sums the block-by-block activities to produce a total activity. A coded data distributing section calculates an amount of coded data to be distributed to each of the blocks on the basis of the ratio of the block-by-block activity to the total activity. A coded output control section limits the amount of coded data to be distributed to each of the blocks from the coding section in response to an output of the coded data distributing section. The block activity calculating section has a subdividing section for subdividing each of the blocks of picture data into a plurality of subblocks, a subblock activity calculating section for calculating the activity of the picture data subblock by subblock, and a difference calculating section for determining a difference between nearby ones of the subblocks with respect to the mean value of subblock-by-subblock picture data.

8 Claims, 7 Drawing Sheets

| 255 255 255 255 | 0   0   0   0 |
| 255 255 255 255 | 0   0   0   0 |
| 255 255 255 255 | 0   0   0   0 |
| 255 255 255 255 | 0   0   0   0 |
| 0   0   0   0 | 255 255 255 255 |
| 0   0   0   0 | 255 255 255 255 |
| 0   0   0   0 | 255 255 255 255 |
| 0   0   0   0 | 255 255 255 255 |

Fig. 6B

| 255 255 255 255 | 0   0   0   0 |
| 255 255 255 255 | 0   0   0   0 |
| 255 255 255 255 | 0   0   0   0 |
| 255 255 255 255 | 0   0   0   0 |
| 255 255 255 255 | 0   0   0   0 |
| 255 255 255 255 | 0   0   0   0 |
| 255 255 255 255 | 0   0   0   0 |
| 255 255 255 255 | 0   0   0   0 |

Fig. 6C

| 255 255 255 255 | 255 255 255 255 |
| 255 255 255 255 | 255 255 255 255 |
| 255 255 255 255 | 255 255 255 255 |
| 255 255 255 255 | 255 255 255 255 |
| 0   0   0   0 | 0   0   0   0 |
| 0   0   0   0 | 0   0   0   0 |
| 0   0   0   0 | 0   0   0   0 |
| 0   0   0   0 | 0   0   0   0 |

DEVICE FOR CODING A PICTURE SIGNAL BY COMPRESSION

BACKGROUND OF THE INVENTION

1. Field of the Invention

The present invention relates to a device for coding a picture signal by compression and, more particularly, to a picture signal compression coding device which maintains the amount of compressed data representative of a picture constant at all times.

2. Description of the Background Art

Digital picture data representative of a picture picked up by an electronic still camera, for example, are stored in a memory. Various kinds of compression coding schemes have been proposed to reduce the amount of such digital picture data and thereby the required memory capacity. Among them, a two-dimensional orthogonal transform coding scheme is extensively used because it codes data by a large compression ratio and because it allows a minimum of picture distortions particular to coding to occur.

Two-dimensional orthogonal transform coding is such that picture data representative of a single picture are divided into a plurality of blocks, and the picture data are subjected to two-dimensional orthogonal transformation block by block. The picture data undergoes orthogonal transformation, i.e., transform coefficients are compared with a predetermined threshold so as to discard those transform coefficients which are lower than the threshold. The transform coefficients lower than the threshold are treated as data zero thereafter. The remaining data are divided by a predetermined quantizing step value, or normalizing coefficient, and thereby quantized or normalized by a step size. By this kind of procedure, the values of transform coefficients, i.e., the dynamic range of amplitudes, is suppressed.

The comparison of transform coefficients with a threshold and the normalization are often executed at the same time. Specifically, when transform coefficients are normalized by a predetermined normalizing coefficient and the results are turned to integers, the transform coefficients which are smaller than the normalizing coefficient turn out to be zero. The normalized transform coefficients are Huffman-coded and then stored in a memory.

In such a two-dimensional orthogonal transformation coding procedure, coding picture data by applying a predetermined normalizing coefficient to transform coefficients is problematic in that since the amount of data differs from one coded picture data to another, troublesome processing is needed in writing the picture data to in a memory.

In the light of the above, there has been proposed a system which calculates the degree to which high frequency components are predominant, i.e., an activity is calulated block by block and a normalizing coefficient is selected in matching relation to the calculated activity. By so determining the normalizing coefficient, it is possible to maintain the amount of data representative of a picture constant.

Assume that the number of bits of coded data to be assigned to a single picture is constant. Then, since the individual blocks constituting the picture have different activities, it is desirable that a different number of bits be allocated to each block commensurately with the activity. A prerequisite with such a manner of bit allocation is that the activities of the individual blocks be calculated with accuracy.

Concerning the calculation of block-by-block activities, there has been proposed a method which consists of subdividing a block into a plurality of subblocks, determining the activity subblock by subblock, and adding the activities of the individual subblocks to produce the activity of the entire block. This kind of procedure is successful in promoting the accuracy of block-by-block activity calculation. However, when the pixel data in a certain subblock forming a part of a block have the same level, for example, the calculated activity of the block will be zero even if the subblock of interest is different from the others with respect to the level of the pixel data. The prior art subblock scheme, therefore, is not fully satisfactory when it comes to accurate calculation of block-by-block activities.

SUMMARY OF THE INVENTION

It is therefore an object of the present invention to provide a picture signal compression coding device which normalizes picture data which has undergone two-dimensional orthogonal transformation in matching relation to a picture of interest and calculates block-by-block activities accurately in order to output block-by-block coded data in an adequate amount.

A picture signal compression coding device in accordance with the present invention divides digital picture data constituting a single picture into a plurality of blocks and codes the picture data block by block by two-dimensional orthogonal transformation. An orthogonal transforming section transforms the digital picture data divided into the plurality of blocks by two-dimensional orthogonal transformation. A normalizing section normalizes the transformed data, while a coding section codes the normalized data. A block activity calculating section calculates an activity of the picture data block by block. An activity summing section sums the block-by-block activities to produce a total activity. A coded data distributing section calculates an amount of coded data to be distributed to each of the blocks on the basis of the ratio of the block-by-block activity to the total activity. A coded output control section limits the amount of coded data to be distributed to each of the blocks from the coding section in response to an output of the coded data distributing section. The block activity calculating section has a subdividing section for subdividing each of the blocks of picture data into a plurality of subblocks, a subblock activity calculating section for calculating the activity of the picture data subblock by subblock, and a difference calculating section for determining a difference between nearby ones of the subblocks with respect to the mean value of sub-block-by-subblock picture data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The objects and features of the present invention will become more apparent from the consideration of the following detailed description taken in conjunction with the accompanying drawings which are given by way of illustration only and are not to be considered as limitative of the present invention and in which.

DESCRIPTION OF THE PREFERRED EMBODIMENTS

Figure 1:
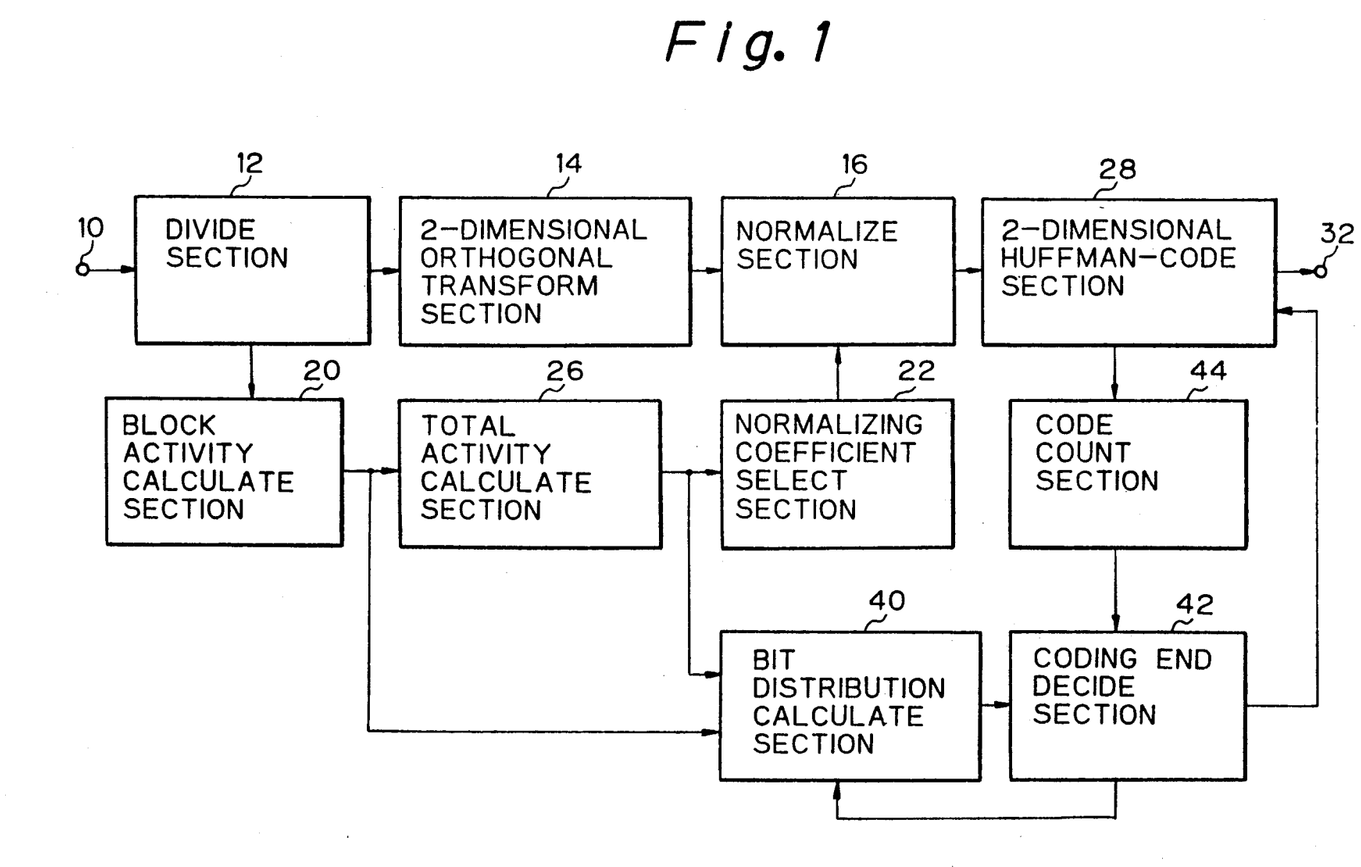
FIG. 1 is a block diagram schematically showing a picture signal compression coding device embodying the present invention.

Referring to FIG. 1 of the drawings, a compression coding device embodying the present invention is shown and includes a dividing section 12 which is implemented by a frame buffer. One frame of still picture data picked up by an electronic still camera, for example, is applied to and stored in the dividing section 12 via an input terminal 10. The dividing section 12 divides the one frame of picture data into a plurality of blocks and delivers them block by block to a two-dimensional orthogonal transforming section 14. The orthogonal transforming section 14 transforms the picture data block by block by discrete cosine transform, Hadamard transform or similar two dimensional orthogonal transform known in the art.

Each block of picture data which has undergone two-dimensional orthogonal transform as stated above is arranged in rows and columns. The order of data sequentially increases from the top left in directions indicated by arrows. Data representative of DC components are arranged in a top left portion. The output of the orthogonal transforming section 14 is fed to a normalizing section 16.

The normalizing section 16 compares the transformed picture data, i.e., transform coefficients from the orthogonal transforming section 14 are compared with a predetermined threshold value so as to discard those coefficients which are smaller than the threshold value. The transform coefficients other than the discarded ones are divided by a predetermined quantizing step size, or normalizing coefficient $\alpha$, and thereby quantized by the normalizing coefficient $\alpha$. The normalizing coefficient $\alpha$ is selected on the basis of the sum of activities of the individual block and by referencing a look-up table, as will be described in detail later.

Each block of data from the dividing section 12 is also fed to a block activity calculating section 20. The block activity calculating section 20 determines the activities of the individual blocks, i.e., the degrees of the individual block to which picture data of high frequency components are predominant.

Figure 2:
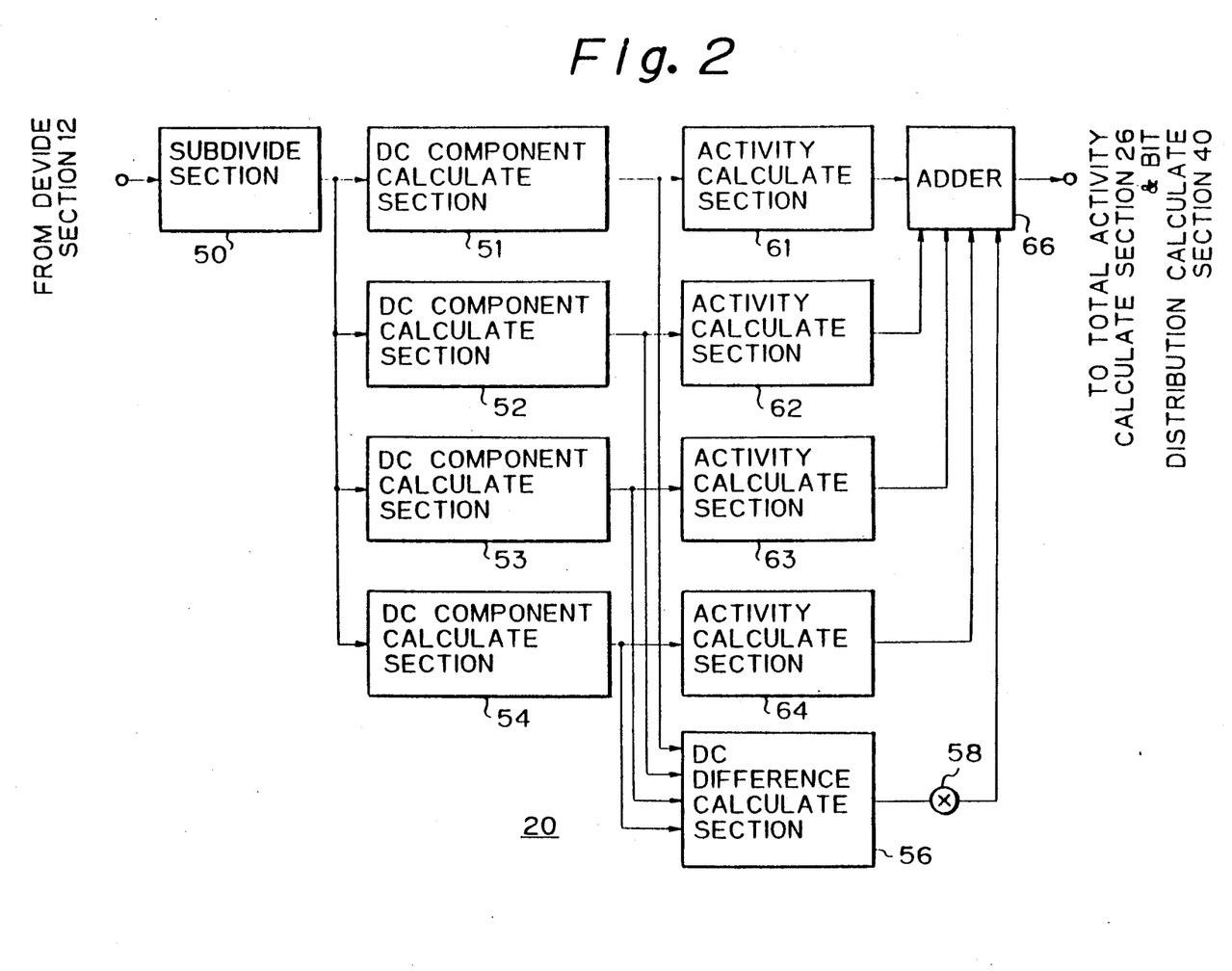
FIG. 2 is a schematic block diagram showing a block activity calculating section included in the device of FIG. 1.
Figure 3:
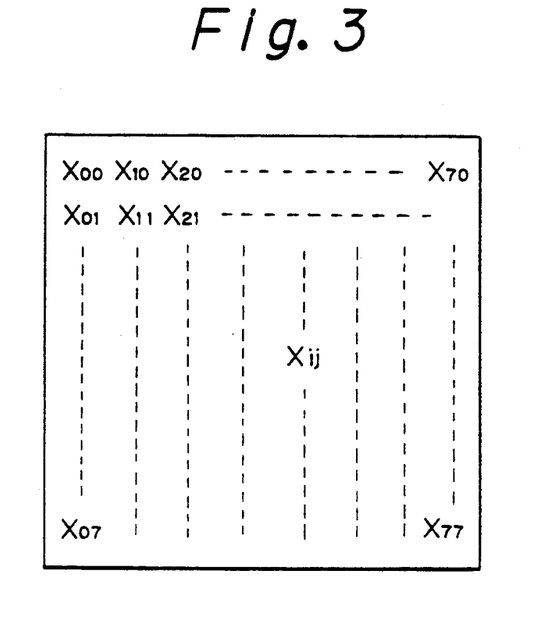
FIG. 3 shows a block having specific pixel data and constituting a picture together with other blocks.
Figure 4:
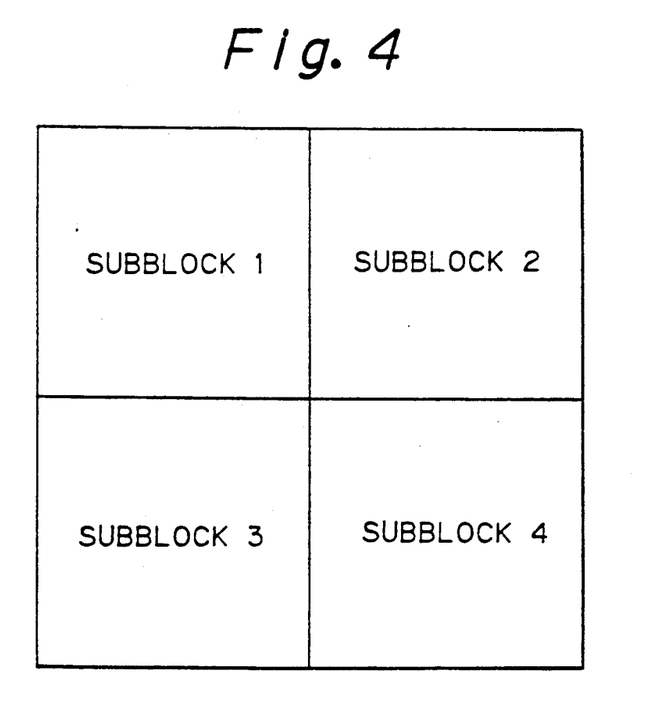
FIG. 4 shows a block which is subdivided into four subblocks.

FIG. 2 indicates a specific construction of the block activity calculating section 20. As shown, this section 20 has a subdividing section 50. As the dividing section 12 delivers a block of picture data such as shown in FIG. 3 to the subdividing section 50, the section 50 further divides the block of picture data into a plurality of subblocks, e.g., four subblocks 1, 2, 3 and 4 as shown in FIG. 4. The output data of the subdividing section 50 associated with the four subblocks 1, 2, 3 and 4 are fed to DC component calculating sections 51, 52, 53 and 54, respectively. In response, the DC component calculating sections 51 to 54 calculate DC components of the data of their associated subblocks 1 to 4. The DC components DC (i, j, 1), DC (i, j, 2), DC (i, j, 3) and DC (i, j 4) of the data associated with the subblocks 1, 2, 3 and 4, respectively, are each determined by producing the average value of the data of the associated subblock.

The outputs of the DC component calculating sections 51, 52, 53 and 54 are applied to activity calculating sections 61, 62, 63 and 64, respectively, and to a DC difference calculating section 56. The subblock activity calculating sections 61, 62, 63 and 64 each calculate the activity of the associated subblock on the basis of the subblock data and the DC component outputted by the associated DC component calculating section 51, 52, 53 or 54. Specifically, the subblock activity calculating section 61, for example, produces the activity ACT (i, j, 1) of the subblock 1, as follows:

$$ACT\ (i,j,1) = \Sigma\Sigma |X(i+K,j+1) - DC(i,j,1)|$$

As the above equation indicates, the activity ACT (i, j, 1) of the subblock 1 is determined by summing up the absolute values of the differences between the individual pixel data constituting the subblock 1 and the average value DC (i, j, 1). This procedure needs only an adder and data shifter because the mean value DC (i, j, 1) is produced by summing up the pixel data and dividing the result by 16, for example. Further, the activity ACT (i, j, 1) is attainable by using the mean value DC (i, j, 1) and an absolute value circuit and an adder. The activity of a subblock, therefore, can be calculated without the use of to a multiplier and a divider.

Likewise, the subblock activity calculating sections 62, 63 and 64 produce respectively the activities of the subblocks 2, 3 and 4 by using the equations:

$$ACT(i,j,2) = \Sigma\Sigma |X(i+4+K,j+1) - DC(i,j,2)|$$

$$ACT\ (i,j,3) = \Sigma\Sigma |X(i+K,j+4+1) - DC(i,j,3)|$$

$$ACT\ (i,j,4) = \Sigma\Sigma |X(i+4+K,j+4+1) - DC(i,j,4)|.$$

The outputs of the subblock activity calculating sections 61 to 64 are fed to an adder 66.

The DC difference calculating section 56 sums up the differences between each two of the DC components DC(i, j, 1), DC(i, j, 2), DC(i, j, 3) and DC(i, j, 4) of the subblocks to thereby produce a sum Diff of the differences between the subblocks, as follows:

$$\text{Diff} = |DC(i,j,2) - DC(i,j,1)| +$$
$$|DC(i,j,4) - DC(i,j,2)| + |DC(i,j,3) - DC(i,j,4)| +$$
$$|DC(i,j,1) - DC(i,j,3)|$$

Figure 5A:
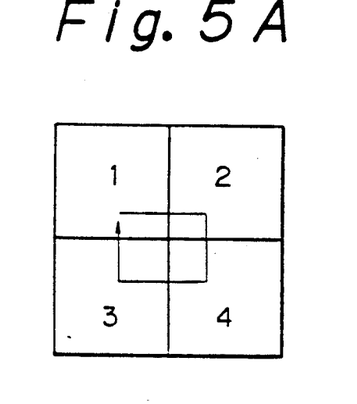
FIGS. 5A to 5C each shows a different order in which a difference between nearby subblocks is sequentially calculated.

In the above equation, the first to the fourth terms are representative of a difference in DC component between the subblocks 1 and 2, a difference between the subblocks 2 and 4, a difference between the subblocks 4 and 3, and a difference between the subblocks 3 and 1. More specifically, as shown in FIG. 5A, the calculating section 56 determines the differences in DC value at the boundary between nearby subblocks in the order of the subblocks 1, 2, 4 and 3, and then produces the sum of the differences.

Figure 6A:
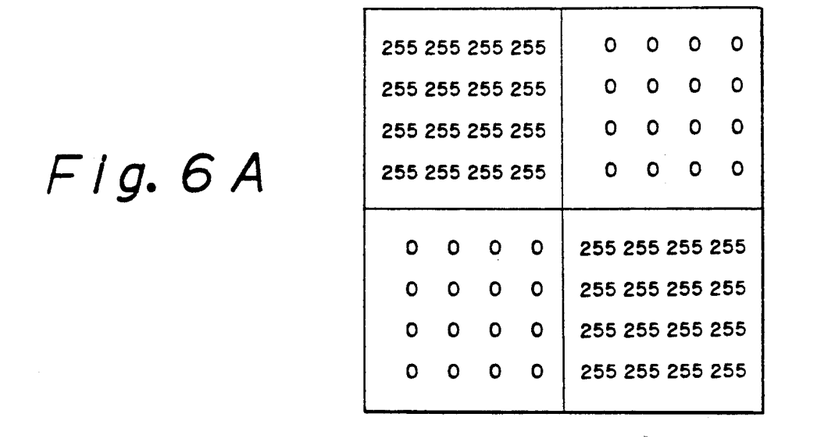
FIGS. 6A to 6C each shows a different block having specific pixel data.

As shown in FIG. 6A, assume that all the data included in each subblock are the same but are different from the data included in the neighboring subblocks. Then, the subblock-by-subblock activity would be zero in all the subblocks and, therefore, the activity of the entire block produced by summing them up would be zero also. In such a case, by summing up the differences at the boundaries between the nearby subblocks as stated above, it is possible to determine the activity of the entire block while taking account of the difference in data between nearby subblocks.

The output of the DC difference calculating section 56 is fed to a multiplier 58. In the illustrative embodiment, the multiplier 58 multiplies the input value by a constant 3, i.e., it multiplies the sum Diff of the differences associated with the subblocks 1 to 4 as stated above by 3 to produce 3Diff. While a constant other than 3 may of course be assigned to the multiplier 58, the illustrative embodiment uses the constant 3 simply because it is preferable in determining the activity of a block. The output of the multiplier 58 is delivered to an adder 66.

The adder 66 sums up the activities of the individual subblocks fed thereto from the activity calculating sections 61 to 64 and the product 3Diff fed from the DC difference calculating section 56. Specifically, the adder 66 produces the activity ACT(i, j) of the entire block by using an equation:

$$ACT(i, j) = \Sigma\Sigma|X(i + K, j + 1) - DC(i, j, 1)| +$$

$$\Sigma\Sigma|X(i + 4 + K, j + 1) - DC(i, j, 2)| +$$

$$\Sigma\Sigma|X(i + K, j + 4 + 1) - DC(i, j, 3)| +$$

$$\Sigma\Sigma|X(i + 4 + K, j + 4 + 1) - DC(i, j, 4)| +$$

$$\{|DC(i, j, 2) - DC(i, j, 1)| + |DC(i, j, 4) - DC(i, j, 2)| +$$

$$|DC(i, j, 3) - DC(i, j, 4)| + |DC(i, j, 1) - DC(i, j, 3)|\} \times 3$$

The block activity ACT(i, j) determined by the adder 66 using the above procedure is fed to a total activity calculating section 26 and a bit distribution calculating section 40 which are shown in FIG. 1.

The total activity calculating section 26 sums the block-by-block activities fed thereto from the block activity calculating section 20, thereby producing the total activity of the blocks which constitute one full picture. The total activity is delivered from the calculating section 26 to a normalizing coefficient selecting section 22 and the bit distribution calculating section 40.

Figure 7A:
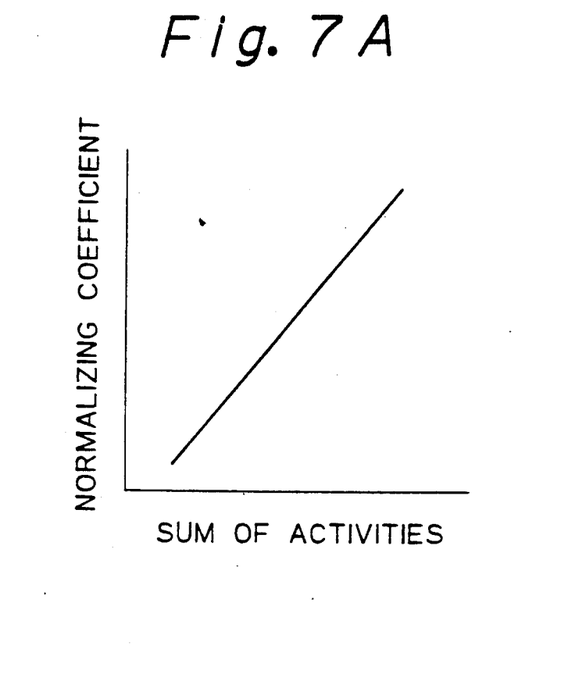
FIGS. 7A and 7B are graphs each representing a different example of a look-up table which may be used to convert the sum of activities into a normalizing coefficient.
Figure 7B:
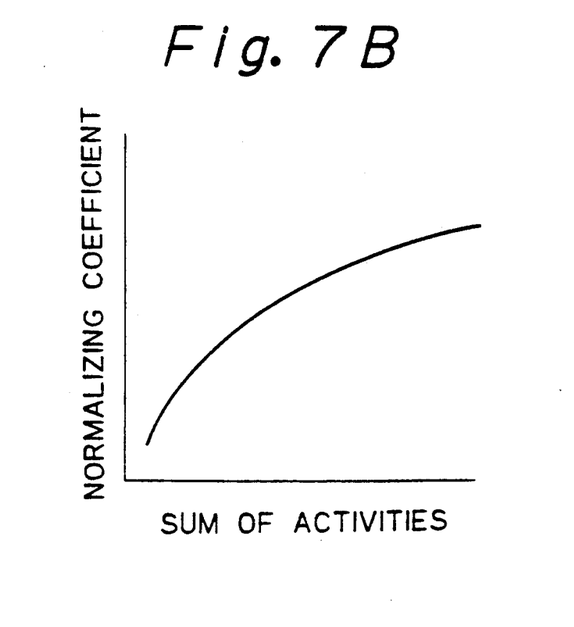

The normalizing coefficient selecting section 22 selects a particular normalizing coefficient matching the total activity outputted by the total activity calculating section 26. To select a normalizing coefficient, a look-up table may be stored in a storing section, not shown, so as to convert a total activity into a normalizing coefficient, as shown in FIGS. 7A or 7B by way of example. In FIG. 7A, the normalizing coefficient is shown as changing in proportion to the total activity. In FIG. 7B, the normalizing coefficient increases at a lower rate than in FIG. 7A relative to the increase in total activity in order to enhance accurate coding. The so selected normalizing coefficient is fed from the normalizing coefficient selecting section 22 to the normalizing section 16.

By using the normalizing coefficient fed from the normalizing coefficient selecting section 22, the normalizing section 16 normalizes the block-by-block picture data, i.e., divides the picture data by the normalizing coefficient. Since the normalizing coefficient used to normalize block-by-block picture data is derived from the sum of the block-by-block activities as stated above, it is common to all the blocks constituting one picture.

Figure 8:
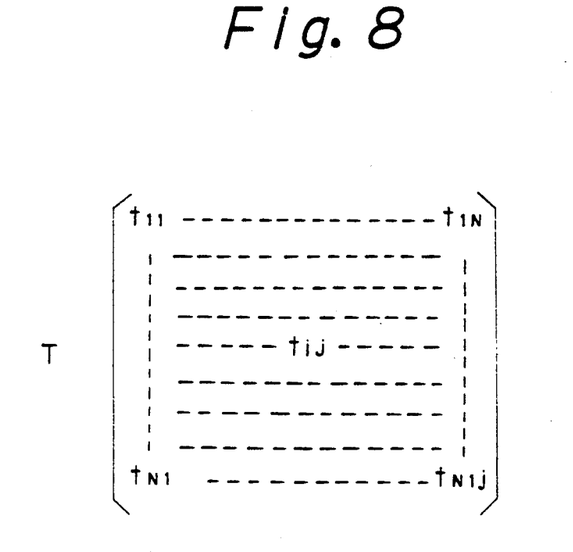
FIG. 8 indicates specific weight table data.

In the illustrative embodiment, the normalization is executed by dividing transform coefficients remaining after particular coefficients have been discarded by the value $\alpha$ of a single normalizing coefficient. Alternatively, the normalizing coefficient $\alpha$ may be used in combination with data stored in a weight table T which is shown in FIG. 8 by way of example. Considering the fact that the transform coefficients lying in a low frequency range are more important as data than those lying in a high frequency range, the weight table T of FIG. 8 has heavier weights in the high frequency range and lighter weights in the low frequency range. With such a weight table T, normalization will be effected by dividing the above-mentioned remaining transform coefficients by the products of the normalizing coefficient and the data of the table T, i.e. $\alpha \cdot T$.

When the transform coefficients are divided by the normalizing coefficient $\alpha$ or the products $\alpha \cdot T$ as described above to execute normalization, the quotient $1/\alpha$ or $1/\alpha \cdot T$ may be produced beforehand to multiply the individual transform coefficients. This advantageously reduces the required number of dividers and, therefore, successfully scales down the entire compression coding device.

Figure 9:
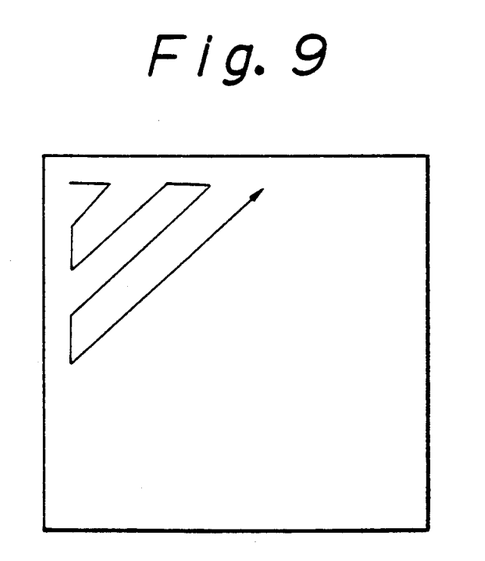
FIG. 9 shows the order in which run-lengths and the amplitudes of non-zeros are sequentially coded.

The normalized transform coefficients are arranged in a block in the same manner as the pixel data shown in FIG. 3 and then sequentially scanned zig-zag from the high frequency component to the low frequency component, as shown in FIG. 9. The so scanned transform coefficients are fed from the normalizing section 16 to a two-dimensional Huffman coding section 28.

Concerning the normalized and scanned transform coefficients applied to the two-dimensional Huffman coding section 28, it often occurs that a string of zeros appears continuously. Hence, the Huffman coding section 28 detects the amounts of continuously appearing zeros, i.e., the run-lengths of zeros to thereby determine the run-lengths of zeros and the amplitudes of non-zeros, and then codes them by two-dimensional Huffman coding. The outputs of the Huffman coding section 28 are applied to an output terminal 32 and a code counting section 44.

The block-by-block activities from the block activity calculating section 20 and the total activity from the total activity calculating section 26 are applied to the bit distribution calculating section 40. In response, the bit distribution calculating section 40 determines the number of coded bits to be allocated to the individual blocks. The number of coded bits to be allocated to each block refers to at which bit the data having been Huffman-coded block by block and sequentially outputted, the lower frequency component being first, should be ended, i.e., up to which bit such data should be outputted.

The number of bits bit(i, j) to be distributed to each of the individual blocks is produced by:

$$\text{bit}(i, j) = \{\text{total number of bits of entire picture} \times ACT(i, j)/\text{total activity}\} + [\text{remaining bits up to preceding block}] \quad \text{Eq. (1)}$$

In the Eq. (1), the term "total number of bits of entire picture" refers to the number of bits to be assigned to the entire picture which is made up of a plurality of blocks. More specifically, it is representative of the number of bits to be assigned to the entire picture when block-by-block two-dimensional Huffman-coded data is sequentially outputted, the low frequency component being first wherein each is ended at a particular bit. Such a number of bits determines the amount of data to be compressed and outputted.

The activity ACT (i, j) is the block-by-block activity, while the total activity is the sum of the block-by-block activities. Hence, the term "total number of bits of entire picture×ACT(i, j)/total activity" in the Eq. (1) means that the number of bits assigned to the entire picture is distributed to the individual blocks on the basis of the ratio of the activity of one block to the total activity of all the blocks. On the other hand, the term "remaining bits up to preceding block" refers to the number of bits remaining as non-outputted up to the block immediately preceding a block of interest to which a particular number of coded bits bit (i, j) is to be distributed, i.e., the difference between the number of bits distributed up to the immediately preceding block and the number of bits actually coded and outputted. For example, assuming that fifty bits were allocated to the immediately preceding block and forty-five bits were actually coded and outputted, then the number of remaining bits is five. Such a remaining number of bits is added for the purpose of preventing the difference between the distributed number of bits and the actually outputted number of bits from accumulating block after block.

The bit distribution counting section 40 may determine the number of coded bits bit (i, j) to be distributed to a block by using an alternative approach as represented by an equation:

$$\text{bit}(i, j) = [\text{total number of bits of entire picture} - \Sigma\Sigma\text{bit}(k, l)] \times ACT(i, j) \quad \text{Eq. (2)}$$

In the Eq. (2), "Σ Σ bit (k, 1)" is the total number of bits distributed up to the immediately preceding block and sequentially changes. Hence, "total number of bits of entire picture−Σ Σ bit (k, 1)" indicates the total number of bits to be allocated to the remaining block or blocks. Further "Σ Σ ACT (i, j)" is representative of the sum of block-by-block activities up to the immediately preceding block. It follows that "total activity−Σ Σ ACT (i, j)" refers to the sum of activities of the remaining blocks.

By the Eq. (2), the total number of bits available for the remaining blocks are allocated on the basis of the ratio of the activity of a block to the sum of the activities of the remaining blocks. More specifically, the number of bits bit (i, j) to be distributed to a remaining block is determined by taking account of the number of bits having been distributed to the immediately preceding block and the sum of the block-by-block activities up to the immediately preceding block. The Eq. (2), therefore, reduces the difference between the sum of the numbers of bits distributed to the blocks and the total number of bits which constitute a picture, compared to the Eq. (1).

Another alternative approach for determining the number of coded bits bit (i, j) to be distributed to a block is as follows:

$$\text{bit}(i, j) = [\text{total number of bits of entire picture} - \text{bit actually fed up to } \Sigma \text{ block}] \times ACT(i, j)/[\text{total activity} - \Sigma\Sigma ACT(i, j)] \quad \text{Eq. (3)}$$

In the Eq. (3), "bit actually fed up to Σ block" indicates the sum of the numbers of bits actually coded and outputted up to the immediately preceding block. Hence, "total number of bits of entire picture-bit actually fed up to Σ block" is representative of the total number of bits to be allocated to the remaining bits and which takes account of the number of bits having been actually coded and outputted up to the immediately preceding bit.

Therefore, by the approach represented by the Eq. (3), the total number of bits to be distributed to the remaining blocks and taking account of the number of bits actually coded and outputted up to the immediately preceding block are distributed to each of the remaining blocks on the basis of the ratio of the block activity of the block to the sum of the block-by-block activities of the remaining blocks. The Eq. (3) is contrastive to the Eqs. (1) and (2) in that the remaining bits up to the immediately preceding block does not have to be taken into account because the number of coded bits (i, j) to be allocated to a block is determined by considering the number of bits having been actually outputted up to the immediately preceding block and the activities up to the immediately preceding block.

The number of coded bits bit (i, j) to be distributed to each block and outputted by the bit distribution calculating section 40 is fed to a coding end deciding section 42. On the other hand, the coded output from the two-dimensional Huffman coding section 28 is applied to the code counting section 44. The code counting section 44 counts block by block the amount of codes, i.e., the accumulation of bits outputted by the two-dimensional Huffman coding section 28. The code counting section 44 delivers to the coding end deciding section 42 data to which the number of bits to be next outputted by the Huffman coding section 28 has been added.

The coding end deciding section 42 compares the number of bits outputted by the code counting section 44 and the number of coded bits bit (i, j) outputted by the bit distribution counting section 40 and which is to be allocated to each block. When the coding end deciding section 42 determines that the number of bits being sequentially inputted from the code counting section 44 has exceeded the number of coded bits bit (i, j), it feeds a signal to the Huffman coding section 28 for instructing the latter to stop outputting codes. In response, the Huffman coding section 28 stops delivering the coded data corresponding to the number of bits added last by the code counting section 44, i.e., the coded data to be outputted next. This prevents the number of bits of coded and outputted data from exceeding the number of coded bits bit (i, j) which is fed from the bit distribution counting section 40. More specifically, the coded data are outputted up to the coded data which is one bit short of the distributed coded bit.

The coding end deciding section 42 further determines the difference between the number of distributed bits and the number of bits of data having been coded and outputted, i.e., the number of remaining bits and delivers it to the bit distribution calculating section 40. In the case that the number of coded bits bit (i, j) to be distributed is determined by using the Eq. (1) or (2), the bit distribution calculation section 40 will use the number of remaining bits.

The compressed picture data from the two-dimensional Huffman coding section 28 are applied to the output terminal 32. The data from the output terminal 32 may be fed out to a transmission path, not shown, or recorded in a magnetic disk or similar recording medium.

The embodiment shown and described determines the number of coded bits to be allocated to a block of interest by using the ratio of the block-by-block activity to the total activity. Therefore, the number of bits to be distributed to the entire picture which consists of a plurality of blocks is maintained constant, while the number of bits to be allocated to a block is determined on the basis of the activity particular to that block. This allows each block of data to be effectively coded based on the activity of that block. Specifically, larger number of bits are allocated to blocks having many high frequency components therein and, therefore, high activities, while smaller number of bits are allocated to blocks having many low frequency components and, therefore, low activities.

The activity of a block is determined by dividing the block into a plurality of subblocks, then calculating the activity of each subblock, and then summing the subblock-by-subblock activities. Specifically, the degree to which high frequency components are predominant is determined subblock by subblock, whereby the activity of the block is calculated with higher accuracy.

Furthermore, the differences between nearby subblocks are summed up to produce a difference Diff, and then the difference Diff is added to the subblock-by-subblock activities, as stated earlier. Hence, even when the value changes little within a subblock but noticeably changes from one subblock to another, the block-by-block activity can be calculated accurately with the difference between nearby subblocks being taken into account.

In the illustrative embodiment, picture data are normalized by a normalizing coefficient α which matches the frequency components contained in the entire picture. A reproduced picture, therefore, does not suffer from unstable quality as would occur if blocks of picture data were normalized with a normalizing coefficient being selected block by block.

Figure 5B:
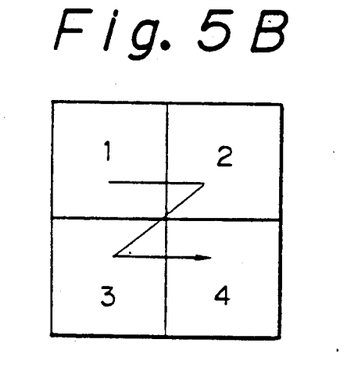
Figure 5C:
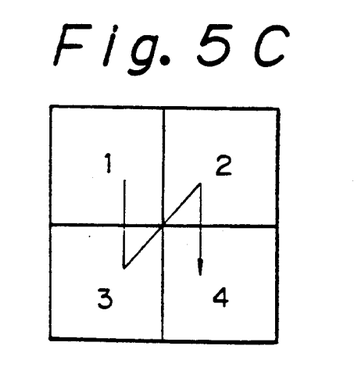
Figure 6B:
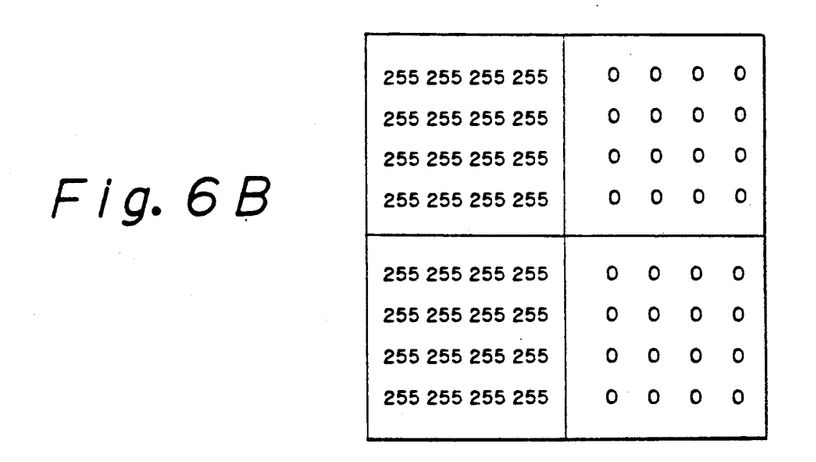
Figure 6C:
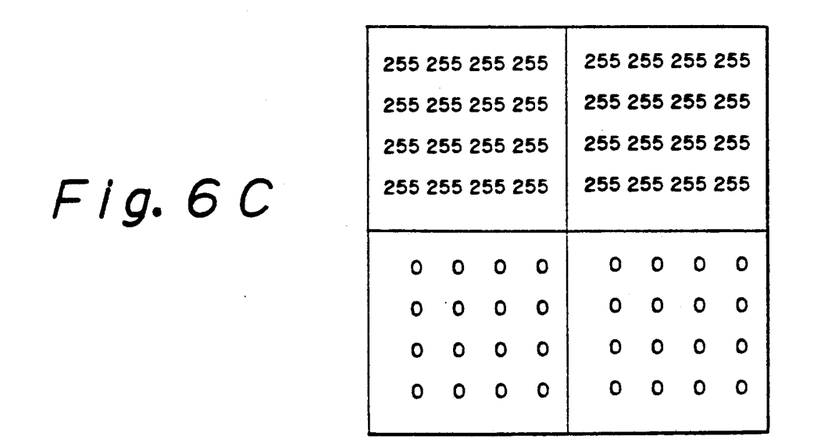

In the illustrative embodiment, as shown in FIG. 5A, the activity of a block is calculated by determining a difference between subblocks in the order of subblocks 1, 2, 4 and 3. Alternatively, the difference may be determined in the order of subblocks 1, 2, 3 and 4, as shown in FIG. 5B. The specific sequence shown in FIG. 5B is advantageously applicable to picture data shown in FIG. 6B, for example. Further, as shown in FIG. 5C, the subblocks may even be scanned in the order of subblocks 1, 3, 2 and 4, and this procedure will be effective when the picture data are arranged as shown in FIG. 6C, for example.

In summary, it will be seen that the present invention provides a compression coding device which limits the amount of coded output associated with certain blocks on the basis of the ratio of the activity of that block to the sum of block-by-block activities. This allows each block to be outputted by an amount of data matching the frequency components particular to the block.

To calculate the block-by-block activities, each block is subdivided into subblocks so as to use subblock-by-subblock activities, whereby accurate calculation is promoted. Further, difference between nearby subblocks are also taken into consideration in determining the block-by-block activity, so that the total activity is determined with accuracy even when picture data noticeably differs from one subblock to another.

While the present invention has been described with reference to the particular illustrative embodiment, it is not be restricted by the embodiment but only by the appended claims. It is to be appreciated that those skilled in the art can change or modify the embodiment without departing from the scope and spirit of the present invention.

What is claimed is:

1. A picture signal compression coding device which divides digital picture data constituting a single picture into a plurality of blocks and codes the digital picture data block by block by two-dimensional orthogonal transformation, comprising:

orthogonal transforming means for transforming the digital picture data divided into the plurality of blocks by a two-dimensional orthogonal transformation;

normalizing means for normalizing the data transformed by said orthogonal transforming means with a normalizing coefficient common to all blocks of the single picture;

coding means for coding the data normalized by said normalizing means, lower frequency components of the normalized data being coded and output before higher frequency components;

block activity calculating means for calculating an activity, or degree of predominant high frequency components, of the digital picture data block by block;

activity summing means for summing the block-by-block activities calculated by said block activity calculating means to produce a total activity;

coded data distributing means for calculating an amount of coded data to be distributed to each of the blocks on the basis of a ratio of the block-by-block activity calculated by said block activity calculating means to the total activity produced by said activity summing means; and coded output control means for limiting the amount of coded data to be distributed to each of the blocks from said coding means in response to an output of said coded data distributing means, said block activity calculating means comprising subdividing means for subdividing each of the blocks of the digital picture data into a plurality of subblocks, subblock activity calculating means for calculating an activity of the digital picture data subblock by subblock, and difference calculating means for determining a difference between nearby subblocks with respect to a mean value of subblock-by-subblock picture data, the activities of the blocks being calculated in accordance with the subblock-by-subblock activities and the difference between nearby subblocks.

2. The picture signal compression coding device in accordance with claim 1, wherein said block activity calculating means calculates the activity of each of the blocks by summing up the subblock-by-subblock activities determined by said subblock activity calculating means and a sum of the differences between nearby subblocks determined by said difference calculating means.

3. The picture signal compression coding device in accordance with claim 2, wherein said block activity calculating means triples the sum of the differences between nearby subblocks and adds said tripled sum to a sum of the subblock-by-subblock activities.

4. The picture signal compression coding device in accordance with claim 2, wherein each of the blocks is subdivided into four subblocks, the sum of the differences between the subblocks being the sum of four differences between nearby ones of said four subblocks.

5. The picture signal compression coding device in accordance with claim 3, wherein each of the blocks is subdivided into four subblocks, the sum of the differences between the subblocks being the sum of four differences between nearby ones of said four subblocks.

6. A method of picture signal compression coding comprising the steps of:

dividing digital picture data of a single picture into a plurality of blocks in a divider;

orthogonally transforming the digital picture data of each of the blocks in a two-dimensional orthogonal transformation means;

normalizing the transformed digital picture data with a normalizing coefficient common to all blocks of the single picture in normalization means;

coding the normalized data in a coding means, lower frequency components of the normalized data being coded and outputted before higher frequency components;

calculating an activity, or degree of predominant high frequency components, of the digital picture data of each block in calculation means;

summing the calculated activities of each of the blocks to generate a total activity of the single picture;

calculating, in distribution means, an amount of coded data to be distributed to each of the blocks on the basis of a ratio of the activity of the particular block and the total activity of the single picture; and generating a limiting signal, in coded output control means, which limits the amount of coded data of each of the blocks output by the coding means in response to said calculating of an amount, the activity of each block being calculated in accordance with calculated subblock activities and a difference between nearby subblocks.

7. The method of picture signal compression coding of claim 6, said step of calculating an activity of each of the blocks comprising summing the calculated subblock activities and a sum of differences between adjacent subblocks.

8. The method of picture signal compression coding of claim 7, said step of calculating an activity of each of the blocks further comprising tripling the sum of differences between adjacent subblocks.

* * * * *